(12) United States Patent
Harris

(10) Patent No.: US 9,360,289 B2
(45) Date of Patent: Jun. 7, 2016

(54) SQUARING AND LEVELING TOOL

(71) Applicant: Chuck L. Harris, Ottumwa, IA (US)

(72) Inventor: Chuck L. Harris, Ottumwa, IA (US)

(73) Assignee: Chuck L. Harris, Ottumwa, IA (US)

( * ) Notice: Subject to any disclaimer, the term of this patent is extended or adjusted under 35 U.S.C. 154(b) by 0 days.

(21) Appl. No.: 13/905,742

(22) Filed: May 30, 2013

(65) Prior Publication Data

US 2013/0318804 A1 Dec. 5, 2013

Related U.S. Application Data

(60) Provisional application No. 61/653,063, filed on May 30, 2012.

(51) Int. Cl.
*G01B 3/56* (2006.01)
*G01C 9/26* (2006.01)

(52) U.S. Cl.
CPC . *G01B 3/566* (2013.01); *G01C 9/26* (2013.01)

(58) Field of Classification Search
CPC .............. G01C 9/10; G01C 9/26; G01C 9/28
USPC .............................. 33/342, 429, 474, 482, 483
See application file for complete search history.

(56) References Cited

U.S. PATENT DOCUMENTS

| | | | | |
|---|---|---|---|---|
| 2,382,250 A * | 8/1945 | Newell | | 33/429 |
| 2,998,655 A * | 9/1961 | White | | 33/340 |
| 3,010,209 A * | 11/1961 | McKinley | | 33/481 |
| 3,293,752 A * | 12/1966 | Shuman | | 33/470 |
| 4,573,276 A * | 3/1986 | Torczon | | 33/481 |
| 5,396,710 A * | 3/1995 | Battaglia | | 33/429 |
| 6,070,336 A * | 6/2000 | Rodgers | | 33/370 |
| 7,069,659 B1 * | 7/2006 | Rye | | 33/482 |
| 7,305,773 B2 * | 12/2007 | Hios | | 33/429 |
| 7,363,719 B2 * | 4/2008 | Levinson et al. | | 33/384 |
| 7,882,643 B1 * | 2/2011 | Portinen | | 33/474 |
| 8,307,564 B1 * | 11/2012 | Heaton | | 33/476 |
| 2006/0021239 A1 * | 2/2006 | Brown | | 33/365 |
| 2007/0113414 A1 * | 5/2007 | Levinson et al. | | 33/451 |
| 2007/0245581 A1 * | 10/2007 | Hios | | 33/429 |
| 2009/0064516 A1 | 3/2009 | Diaz et al. | | |
| 2013/0318804 A1 * | 12/2013 | Harris | | 33/342 |

* cited by examiner

*Primary Examiner* — Yaritza Guadalupe-McCall

(57) ABSTRACT

A multi-purpose squaring and leveling tool comprising a generally trapezoidal body, angled corners, and leveling inserts. The tool may be used for tradesman, pipe fitters, and home carpenters as a means of setting joints and other construction or repair. The shape of the tool allows for the squaring and leveling of joints around obstacles which may present barriers to traditional squaring tools.

9 Claims, 4 Drawing Sheets

SQUARING AND LEVELING TOOL

CROSS-REFERENCE TO RELATED APPLICATION(S)

The present application claims priority to U.S. Provisional Patent Application 61/653,063, filed May 30, 2012, which is hereby incorporated by reference in its entirety.

FIELD OF THE INVENTION

This invention relates to a tool for use in pipe fitting, carpentry, and other trades.

BACKGROUND OF THE INVENTION

A vast number of tools for measuring and leveling are used in the field of pipe fitting. Pipefitters and other tradesmen have long used levels, rulers and squares to establish exact lengths and angles in their work. Speed squares, torpedo levels, T-bevels and the like are often used to establish lengths and angles as to properly assemble joints and the like. A principle problem has been that in certain trades, each of these objects are often carried individually, and thus are burdensome to use together with one hand while holding a pipe, piece of wood, or fastening tool in the other hand. Moreover, particularly amongst pipefitters, the typical pipe fitter's square comes to an apex, which often interferes with a socket or collar at the junction of the two pipes, and thus is cumbersome for a single person to use. Often, one person holds the square and level, often awkwardly, while another person tacks or welds the pipe and joint into place. Additionally, pipefitters often need to mark parallel lines on sides of pipe for mitering at precise angles.

It is a principal object of the multi-purpose tool to provide apparatus, systems and methods for use in leveling and squaring. More particularly, the invention relates to an "all-in-one" tool which, in certain exemplary embodiments comprises a modified square and level combination for domestic and commercial use, particularly in the area of pipe fitting. Certain other examples and embodiments can incorporate a variety of other common devices which would be useful to the tradesman or craftsman.

BRIEF SUMMARY OF THE INVENTION

The present application is directed to apparatus, systems and methods for use domestically, as well as in construction, pipefitting, and other skilled trades.

In certain exemplary embodiments, these apparatus, systems and methods generally relate to a squaring and leveling tool. In further exemplary embodiments, the squaring and leveling tool is a combination square having the apex of the square removed and further comprising one or more levels, and so as to be useful in working with pipes and other objects that have obstacles at the point of the apex. In yet further exemplary embodiments, markings are added so as to be useful in making measurements. Other embodiments are possible, and are within the spirit of the present application.

While multiple embodiments are disclosed, still other embodiments of the multi-purpose tool will become apparent to those skilled in the art from the following detailed description, which shows and describes illustrative embodiments of the invention. As will be realized, the invention is capable of modifications in various obvious aspects, all without departing from the spirit and scope of the multi-purpose tool. Accordingly, the drawings and detailed description are to be regarded as illustrative in nature and not restrictive.

DETAILED DESCRIPTION

Figure 1:
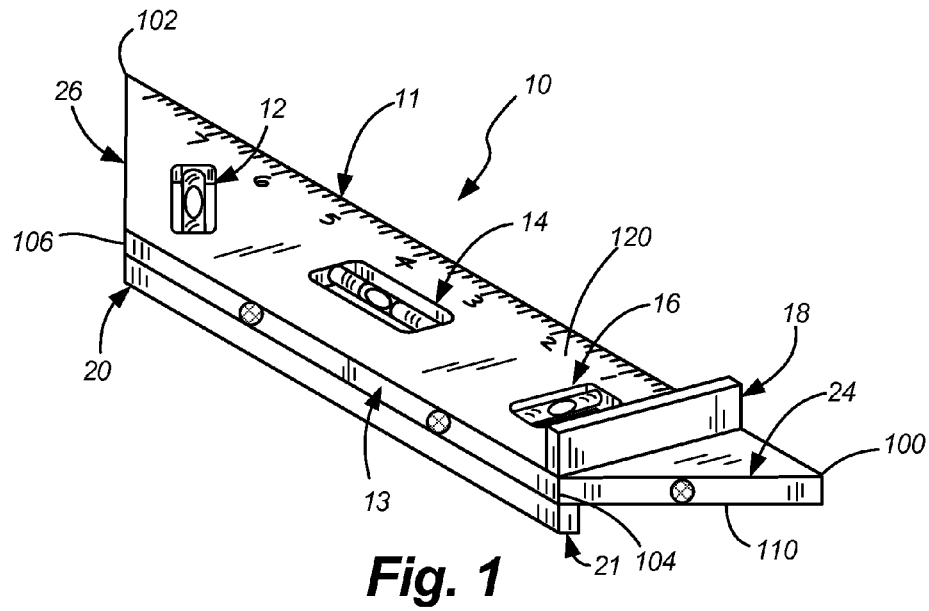
FIG. 1 is a perspective view of one embodiment of the multi-purpose tool.

Turning to the figures, FIGS. 1-4 generally show certain exemplary embodiments of the elongate, unibody squaring and leveling tool 10 having first 110 and second 120 sides. In these exemplary embodiments, the tool 10 comprises a longer, substantially straight first side 11 further comprising first 100 and second 102 ends, and a shorter, substantially straight second side 13 further comprising first 104 and second 106 ends. The first and second ends of the first side accordingly define a straight edge plane, shown at reference arrow C in FIG. 2. The tool 10 can thus generally be shaped like a ruler, or a speed square without the apex, and features a substantially straight angled first end 24 and substantially straight angled second end 26. While this embodiment features 45 degree angles (shown in FIG. 2 at reference letters A and B, respectively such that the angled first 24 and second 26 ends are disposed adjacently, at approximately 45 degrees from the first ends from the first 100 and second 102 ends of the substantially straight first side 11 for forming a generally right triangle (as is shown in FIG. 5), one of skill in the art would understand that other configurations such as 30/60, 60/60 and others could be used.

Figure 2:
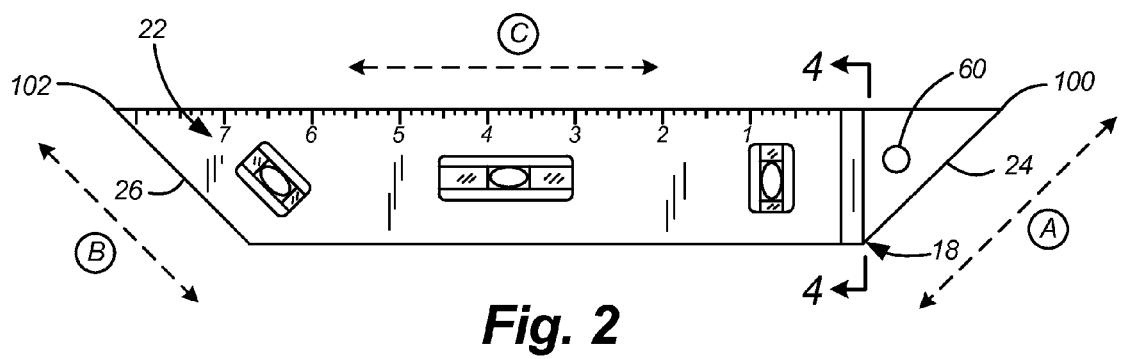
FIG. 2 is a side view of one embodiment of the multi-purpose tool.
Figure 3:
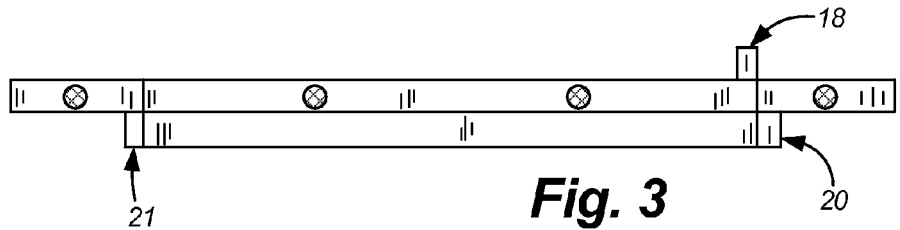
FIG. 3 is a top view of one embodiment of the multi-purpose tool.
Figure 4:
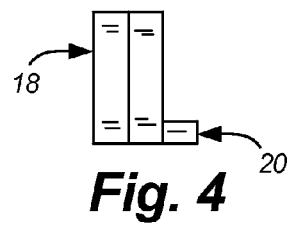
FIG. 4 is an endlong view of one embodiment of the multi-purpose tool.

As shown best in FIGS. 1-2, in exemplary embodiments the tool features a generally trapezoidal body 10, having a variety of inserts. In certain exemplary embodiments the tool 10 is inset with a variety of levels 12, 14, 16, which are set at opposing angles so as to provide the user with the ability to establish a level angle while using the tool 10 in a variety of positions. Although bubble levels 12, 14, 16 are depicted, in certain other exemplary embodiments other levels could be used, as would be apparent to one of skill in the art. The embodiments of the tool 10 depicted in FIGS. 1-2 also features a ruler 22, while other embodiments can include other measuring devices, such as a protractor or other means of establishing angles. In some embodiments, as is best depicted in FIG. 2, the tool 10 can further comprise a hole 60 for mounting to a peg board or attachment to a D-ring so as to attach to a lanyard to assist in OSHA compliance.

Exemplary embodiments of the tool also feature one or more straight edge posts 18, 20 for use as a further squaring means in fitting the tool flush to straight edge studs, boards, uni-struts and other items. Although the embodiment depicted in FIGS. 3-4 has two such posts, other numbers of posts and configurations are possible. The longer post 20 is depicted to have 45 degree end portions 21, but one of skill in the art would realize that other angles would also be appropriate for certain implementations. The posts 18, 20 can also assist in the squaring of picture frames and other mitered boards perpendicularly or otherwise.

Figure 5:
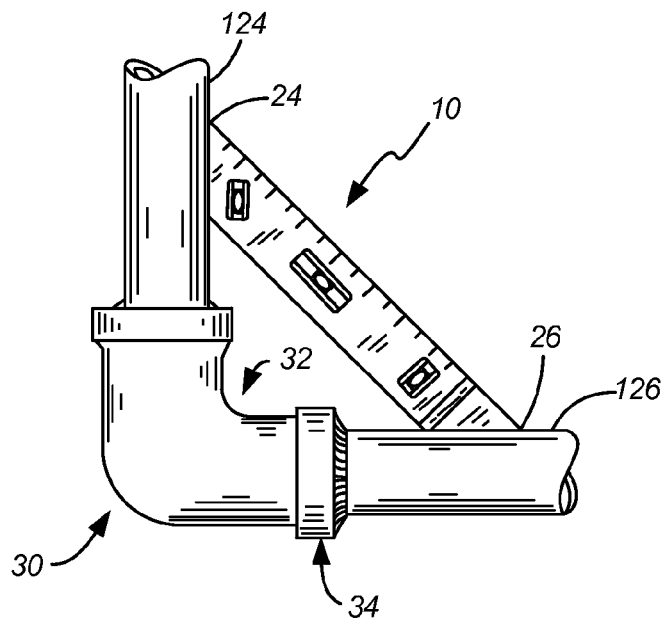
FIG. 5 is a first side view of the multi-purpose tool against a standard 90 degree joint.
Figure 6:
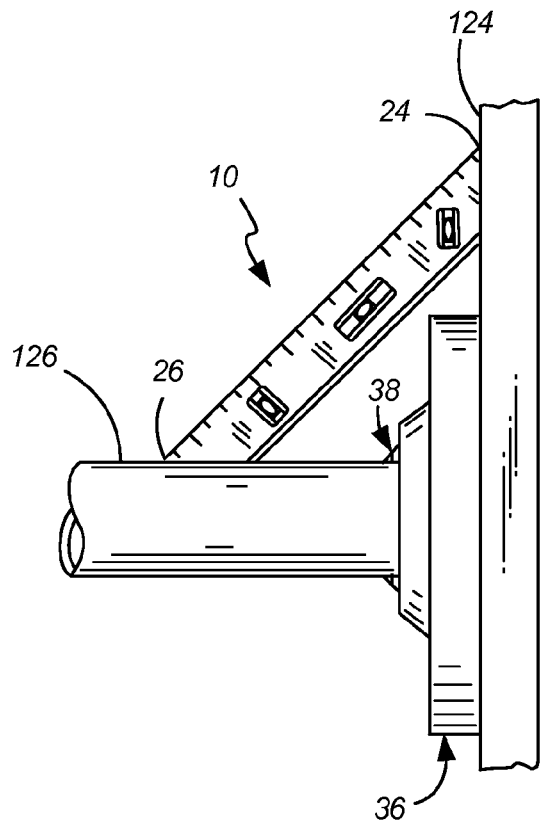
FIG. 6 is a second side view of the multi-purpose tool against a flange.

As best seen in FIGS. 5-6, one of the principle advantages of the present tool 10 is that a user may fit the first and second angled ends 24, 26 flush against the internal planes 124, 126 of a 90 degree L-joint 30 without interference from the joint socket 34 or other objects at the throat 32 of the joint itself, such as square flanges 36. As such, the multi-purpose tool can achieve the same goals as a typical speed square and a torpedo level combined.

By way of example, one embodiment is approximately 10" long on the long side, approximately 7.5" on the shorter side and approximately 1.25" wide with 45 degree angles on the ends and posts ¼" to ⅜". Other embodiments are possible. As shown in FIG. 6, for example, in use this embodiment 10 allows a tradesman such as a pipefitter or other craftsman to tack and weld 38 pipe with one hand while holding the tool 10 in the other while leaving room to clear a typical socket or butt, for example a 3" socket weld, on a 90 degree joint, tee, or flange 36. Because of this exemplary size, the multi-purpose tool is capable of use in most typical pipe fitting applications. In certain other embodiments, the tool may also be sized at, for example, 16" to allow for quick and easy determination of the required distance between wall studs, rafters, and floor joists. As would be apparent to one of skill in the art, many other uses are possible.

Figure 7:
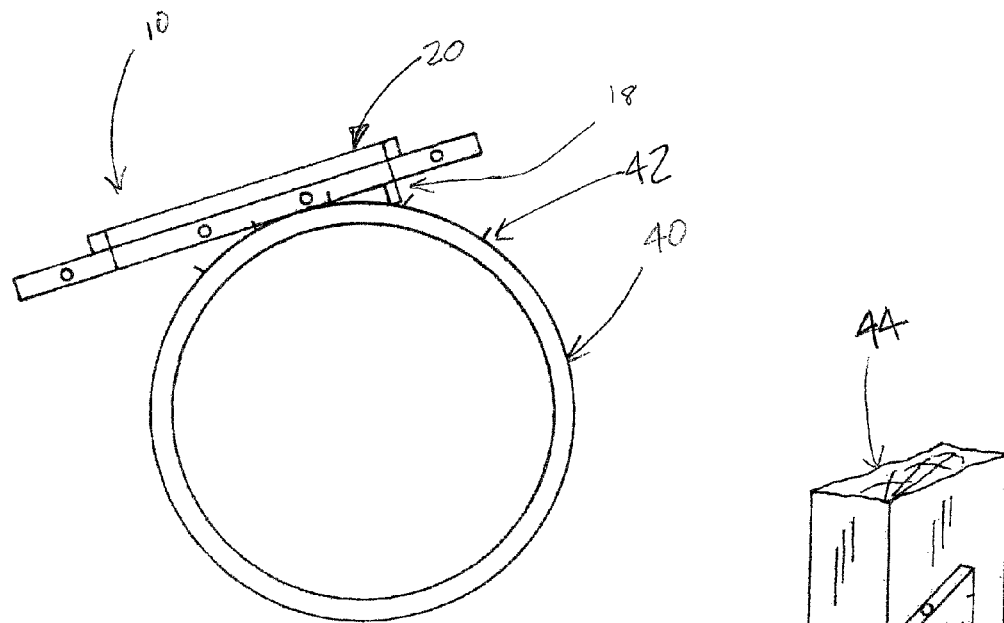
FIG. 7 is a top view of one embodiment of the multi-purpose tool resting against a pipe.

As best shown in FIG. 7, in certain exemplary embodiments the straight edge posts 18, 20 of the multi-purpose tool 10 also may be used lay the tool flat against a rounded piece of pipe 40, so as to mark 42 the pipe with segment lines 42 for mitering the pipe to specific angles.

Figure 9:
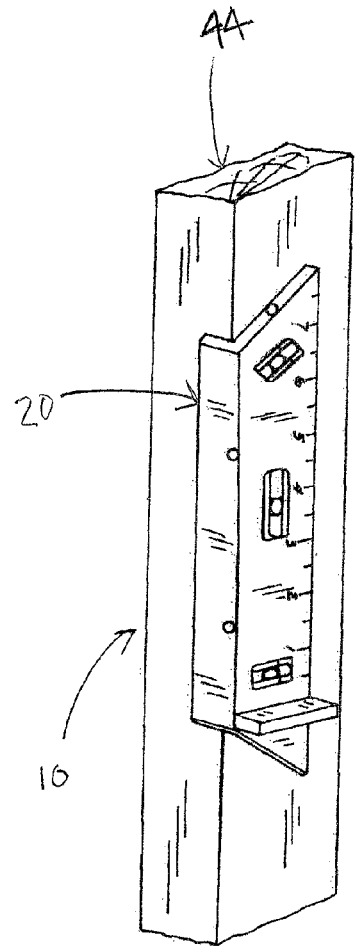
FIG. 9 is a perspective view of one embodiment of the multi-purpose tool against a standard stud.
Figure 8:
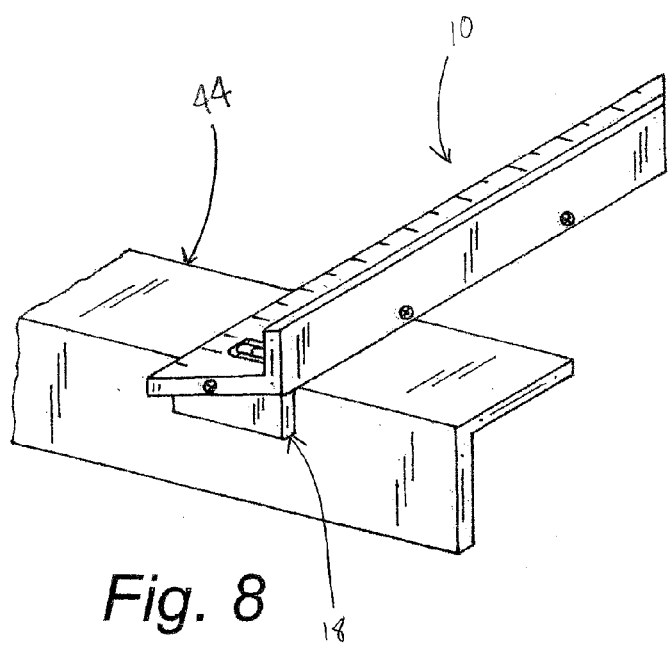
FIG. 8 is a perspective view of one embodiment of the multi-purpose tool against a standard stud.

FIGS. 8-9 depict the use of the tool 10 as a square, fitting flush against studs 44 for marking and measuring angles as well as leveling. In FIG. 8, the tool is shown being used endwise such that the shorter of the straight edge posts 18 is flush against a standard stud 44, so as to allow measurement and leveling. Likewise, in FIG. 9, the tool 10 is shown being used lengthwise such that the longer of the straight edge posts 20 is flush against a standard stud 44, so as to allow measurement and leveling. In certain exemplary embodiments, uni-struts, boards, angle iron, steel beam, pipe and other construction materials can be used, measured or leveled, as would be apparent to one of skill in the art. In further exemplary embodiments, other numbers and configurations of edge posts can be used, so as to suit the tool most ideally for the desired task.

Figure 10:
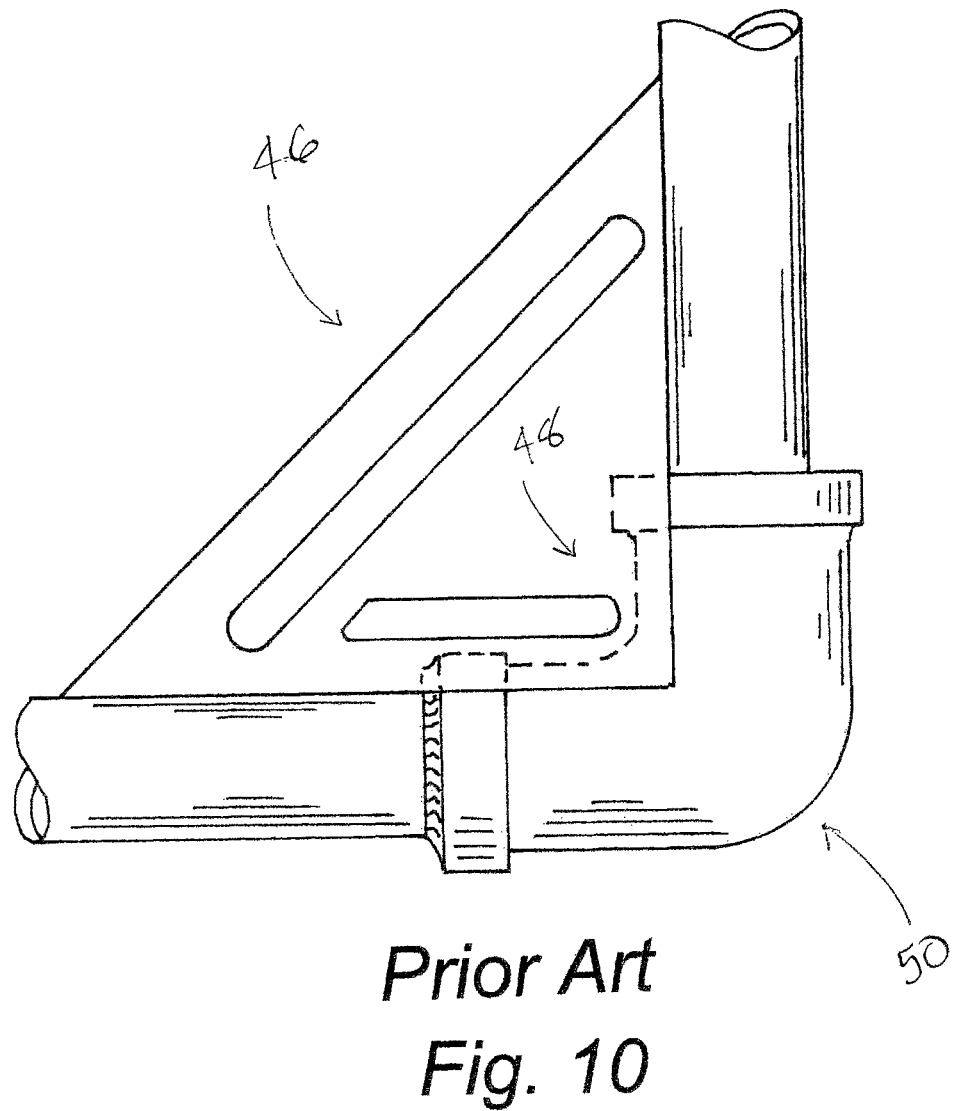
FIG. 10 shows a prior art square superimposed upon a 90 degree joint.

This trapezoidal design also overcomes the problems inherent in the prior art, and as depicted in FIG. 10, wherein the square 46 has comes to the 90 degree angle 48 in the throat of the joint, and the socket of the pipe 50 creates an obstacle. One of skill in the art would understand that variations of the length or shape of the tool will allow the user to overcome obstacles of various sizes when measuring, leveling and squaring.

Although the multi-purpose tool has been described with reference to preferred embodiments, persons skilled in the art will recognize that changes may be made in form and detail without departing from the spirit and scope of the invention.

What is claimed is:

1. A squaring and leveling tool, comprising:
   a. an elongate trapezoidal housing comprising first and second sides and further comprising:
      i. a substantially straight longer first side having first and second ends and defining a straight edge;
      ii. a substantially straight shorter second side having first and second side ends;
      iii. a substantially straight angled first end disposed approximately 45 degrees adjacent from the first side straight edge;
      iv. a substantially straight angled second end disposed approximately 45 degrees adjacent from the first straight edge;
      v. at least one substantially circular housing opening;
      vi. a first rectangular, elongate post fixedly attached to the first housing side along the shorter second side and extending from substantially the first side end to the second side end; and
      vii. a second elongate post fixedly attached to the housing on the second side perpendicular to the first elongate post so as to be disposed between the first side and second side; and b. at least one level inserted into the at least one housing opening;
   wherein the first and second angled ends are configured so as be placed flush against two surfaces disposed at 90 degrees.

2. The squaring and leveling tool of claim 1, further comprising a hole through the trapezoidal housing.

3. The squaring and leveling tool of claim 2, further comprising a ruler.

4. A squaring and leveling system, comprising:
   a. an elongate trapezoidal housing comprising first and second sides and further comprising:
      i. a substantially straight longer first side having first and second ends and defining a straight edge;
      ii. a substantially straight shorter second side having first and second side ends;
      iii. a substantially straight angled first end disposed adjacent from the first side straight edge;
      iv. a substantially straight angled second end disposed adjacent from the first straight edge; and
      v. at least one substantially circular housing opening;
   b. at least one level inserted into the at least one housing opening;
   wherein the first and second angled ends are configured so as be placed flush against two surfaces disposed at an angle; and
   c. a first rectangular, elongate post fixedly attached to the first housing side along the shorter second side and extending from substantially the first side end to the second side end.

5. The squaring and leveling system of claim 4, further comprising a second elongate post fixedly attached to the housing on the second side perpendicular to the first elongate post so as to be disposed between the first side and second side.

6. A method for squaring and leveling, comprising:
   a. providing an elongate trapezoidal housing further comprising:
      i. a substantially straight longer first side having first and second ends and defining a straight edge;
      ii. a substantially straight shorter second side having first and second side ends;
      iii. a substantially straight angled first end disposed 45 degrees adjacent from the first side straight edge;

iv. a substantially straight angled second end disposed 45 degrees adjacent from the first straight edge;
v. at least one substantially circular housing opening;
vi. a first rectangular, elongate post fixedly attached to the first housing side along the shorter second side and extending from substantially the first side end to the second side end;
vii. a second elongate post fixedly attached to the housing on the second side perpendicular to the first elongate post so as to be disposed between the first side and second side; and
viii. at least one level inserted into the at least one housing opening; and b. placing the housing such that the first and second angled ends are flush against two surfaces of a 90 degree L-joint without interference from an object in the throat of the joint.

7. The method of claim 6, wherein the 90 degree L-joint is formed by a pipe.

8. The method of claim 6, further comprising placing the tool flat against a rounded piece of pipe.

9. The method of claim 8, further comprising marking the pipe with segment lines for mitering the pipe to specific angles.

* * * * *